US012272307B2

(12) United States Patent
Park et al.

(10) Patent No.: US 12,272,307 B2
(45) Date of Patent: Apr. 8, 2025

(54) PIXEL CIRCUIT OF DISPLAY APPARATUS

(71) Applicant: LG DISPLAY CO., LTD., Seoul (KR)

(72) Inventors: Yong Chan Park, Paju-si (KR); Ju Hong Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/377,036

(22) Filed: Oct. 5, 2023

(65) Prior Publication Data

US 2024/0257735 A1 Aug. 1, 2024

(30) Foreign Application Priority Data

Jan. 26, 2023 (KR) ........................ 10-2023-0010270

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2310/0208* (2013.01); *G09G 2320/0233* (2013.01)

(58) Field of Classification Search
CPC ............... G09G 3/3233; G09G 3/3291; G09G 2320/0233
See application file for complete search history.

(56) References Cited

U.S. PATENT DOCUMENTS

2009/0309503 A1* 12/2009 Kim ..................... G09G 3/3233 313/504
2011/0090200 A1* 4/2011 Choi .................... G09G 3/3233 345/76
2014/0022288 A1* 1/2014 Tsuge ................... G09G 3/3233 345/76
2021/0005138 A1* 1/2021 Umezawa ............ G09G 3/3233
2023/0260448 A1* 8/2023 Lee ...................... G09G 3/3233 345/55

FOREIGN PATENT DOCUMENTS

KR 20130075429 A * 7/2013 ..... G09G 2320/0233

* cited by examiner

*Primary Examiner* — Yuzhen Shen
(74) *Attorney, Agent, or Firm* — Morgan, Lewis & Bockius LLP

(57) ABSTRACT

A pixel circuit of a display apparatus includes a driving transistor including a gate electrode coupled with a gate node, a drain electrode coupled with a high level pixel power source, and a source electrode coupled with a source node; a light emitting device coupled with the source node and coupled with a low level pixel power source; a first transistor turned on based on a first scan signal; a second transistor turned on based on a second scan signal; a first capacitor coupled between the gate node and the source node; a second capacitor coupled with the source node at one electrode thereof; a third transistor turned on based on a third scan signal to couple the gate node with the other electrode of the second capacitor; and a fourth transistor turned on based on a fourth scan signal to apply a data voltage to the gate node.

10 Claims, 14 Drawing Sheets

PIXEL CIRCUIT OF DISPLAY APPARATUS

CROSS-REFERENCE TO RELATED APPLICATIONS

This application claims the benefit of the Korean Patent Application No. 10-2023-0010270 filed on Jan. 26, 2023, which is hereby incorporated by reference as if fully set forth herein.

BACKGROUND

Technical Field

The present disclosure relates to a pixel circuit of a display apparatus.

Discussion of the Related Art

Display apparatuses include a plurality of pixels arranged as a matrix type and supply image data to the pixels in synchronization with a scan signal, and thus, implement luminance corresponding to the image data in the pixels. Each of the pixels includes a driving transistor which generates a driving current corresponding to the image data and a light emitting device which emits light having brightness proportional to a level of the driving current.

A level of the driving current is determined based on a gate-source voltage of the driving transistor and a threshold voltage of the driving transistor. However, the threshold voltage of the driving transistor may be shifted in the pixels over time taken in using of the driving transistor. Accordingly, when the threshold voltage of the driving transistor is shifted between the pixels, a level of the driving current corresponding to the same image data may be changed in the pixels, and due to this, a luminance deviation between the pixels may occur. Such a luminance deviation degrades display quality.

SUMMARY

Accordingly, embodiments of the present disclosure are directed to a pixel circuit of a display apparatus that substantially obviates one or more of the problems due to limitations and disadvantages of the related art.

An aspect of the present disclosure is to provide a pixel circuit of a display apparatus that may compensate for a threshold voltage deviation between pixels to increase display quality.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these objects and other aspects of the inventive concepts, as embodied and broadly described herein, a pixel circuit of a display apparatus comprises a driving transistor including a gate electrode coupled with a gate node, a drain electrode coupled with a high level pixel power source, and a source electrode coupled with a source node: a light emitting device including an anode electrode coupled with the source node and a cathode electrode coupled with a low level pixel power source: a first transistor turned on based on a first scan signal having an on level to apply an initialization voltage to the gate node: a second transistor turned on based on a second scan signal having an on level to apply a reference voltage to the source node: a first capacitor coupled between the gate node and the source node: a second capacitor coupled with the source node at one electrode thereof; a third transistor turned on based on a third scan signal having an on level to couple the gate node with the other electrode of the second capacitor; and a fourth transistor turned on based on a fourth scan signal having an on level to apply a data voltage to the gate node.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure. In the drawings.

DETAILED DESCRIPTION

Figure 1:
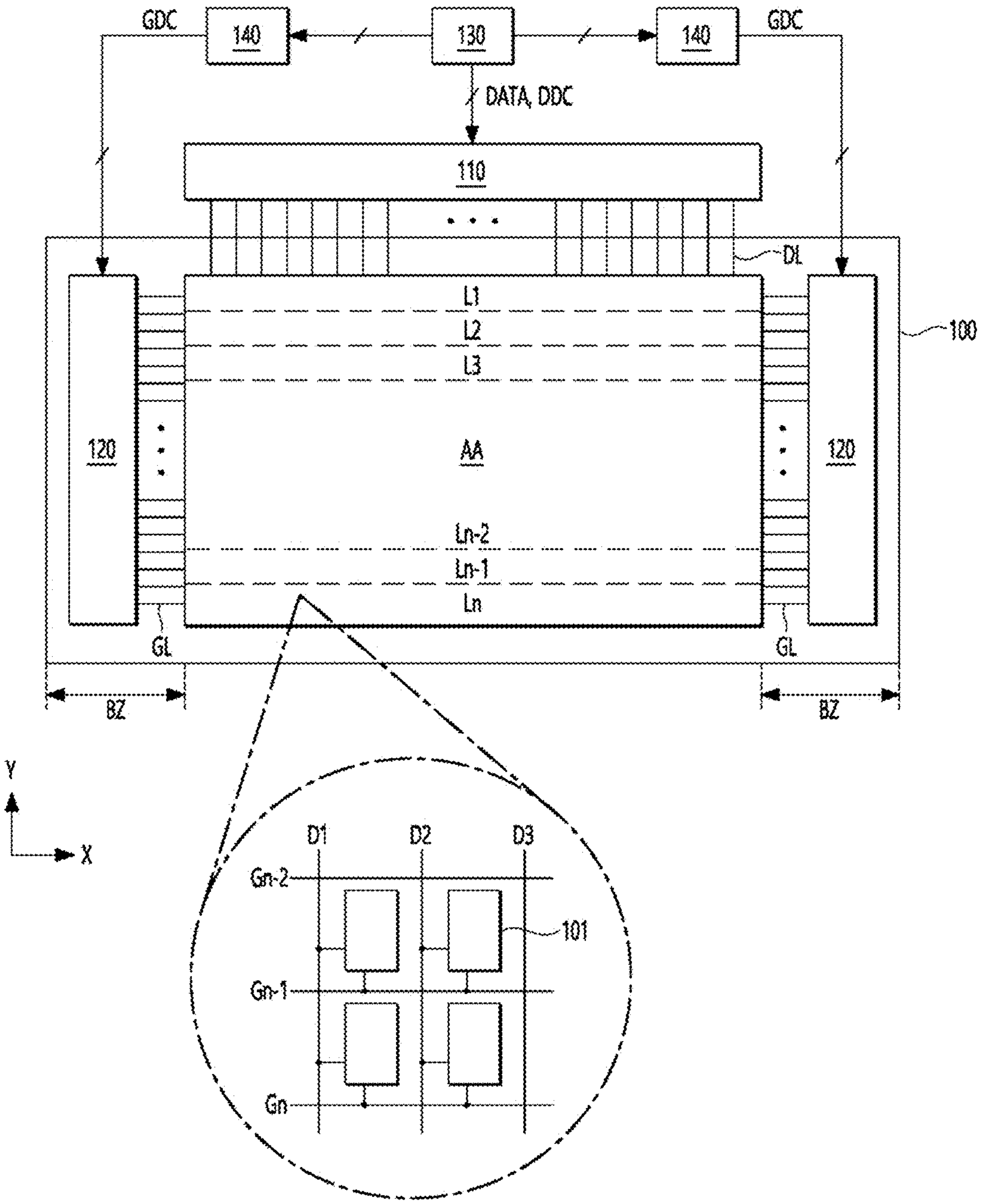
FIG. 1 is a block diagram illustrating a display apparatus according to the present embodiment.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a block diagram illustrating a display apparatus according to an embodiment of the present disclosure.

Referring to FIG. 1, the display apparatus according to an embodiment of the present disclosure may be an organic light emitting display apparatus. A display panel 100 may include a screen AA which displays an input image. The screen AA may include a pixel array which displays an image corresponding to pixel data (hereinafter referred to as image data) DATA of an input image. The pixel array may include a plurality of data lines DL, a plurality of gate lines GL intersecting with the data lines DL, and a plurality of pixels 101.

The pixels 101 may be arranged as a matrix type defined by the data lines DL and the gate lines GL, in the screen AA. The pixels 101 may be arranged as various types, such as a type where pixels emitting the same light are shared, a stripe type, and a diamond type in addition to a matrix type, in the screen AA.

The pixel array may include a pixel column and a plurality of pixel lines L1 to Ln intersecting with the pixel column. The pixel column may include pixels which are arranged in a y-axis direction. The pixel line may include pixels which are arranged in an x-axis direction. One vertical period may be one frame period which is needed for writing image data DATA of one frame in all pixels of a screen. One horizontal period may be a time obtained by dividing one frame period by the number of pixel lines L1 to Ln. One horizontal period may be a time which is needed for writing image data DATA of one pixel line in pixels of one pixel line.

The pixels 101 may include a red (R) pixel, a green (G) pixel, and a blue (B) pixel 101 so as to implement colors. The pixels 101 may further include a white (W) pixel.

The pixel circuit may include a light emitting device, a driving transistor, one or more switch transistors, and a capacitor. The light emitting device may be implemented with an organic light emitting diode (OLED). A driving current applied to the light emitting device may be adjusted based on a gate-source voltage of the driving transistor. The driving transistor and the switch transistor may include a semiconductor layer implemented with amorphous silicon or polysilicon. A semiconductor layer of at least some of the transistors may include oxide. The pixel circuit may be connected (or, coupled) with a data line DL and a gate line GL. In FIG. 1, "DI to D3" illustrated in a circle may be data lines, and "Gn−2 to Gn" may be gate lines. Each of the pixels 101 of FIG. 1 may include the same pixel circuit.

The pixel circuit may sense a threshold voltage of the driving transistor in a data programming operation performed in one frame period and may allow the threshold voltage to be reflected in the gate-source voltage of the driving transistor, and thus, may prevent the driving current from being distorted by the shift of the threshold voltage of the driving transistor.

The pixel circuit may quickly sense the threshold voltage of the driving transistor in performing a data programming operation, and thus, may more effectively compensate for a threshold voltage deviation between pixels, thereby increasing display quality.

Touch sensors may be disposed in the display panel 100. The touch sensors may be disposed as an on-cell type or an add-on type in the screen AA of the display panel 100, or may be implemented as in-cell type touch sensors embedded in the pixel array. A touch input may be sensed through the touch sensors, or may be sensed through only the pixels 101 even without the touch sensors.

The display panel driver may include a source driver 110 and a gate driver 120. The display panel driver may write the image data DATA in the pixels 101 of the display panel 100, based on control by a timing controller 130.

Figure 2:
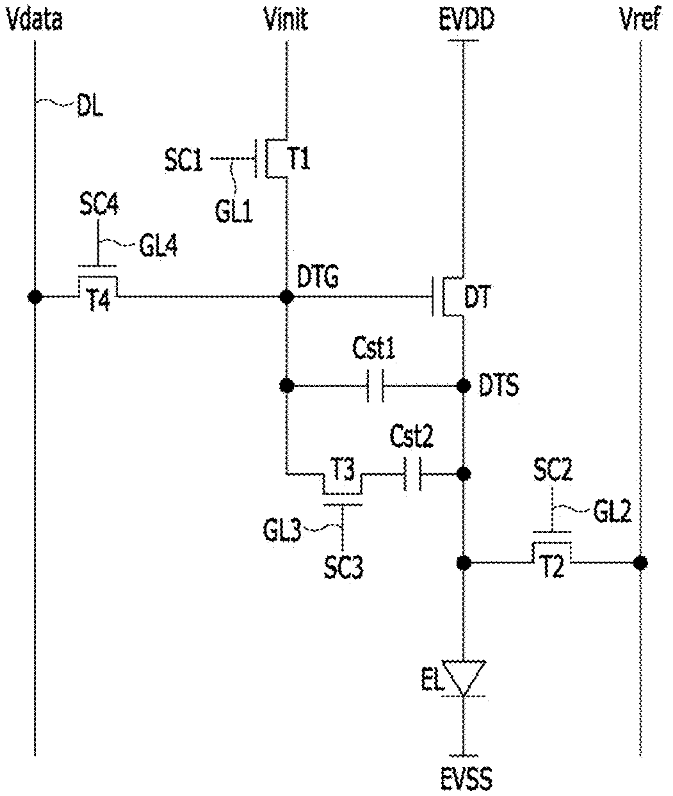
FIG. 2 is a diagram illustrating a pixel circuit of a display apparatus according to a first embodiment.

The source driver 110 may convert the image data DATA, received from the timing controller 130, into a gamma compensation voltage by using a digital-to-analog converter (DAC) to generate data voltages. The source driver 110 may supply the data voltages to the data lines DL. The data voltage may be supplied to each of the data lines DL and may be applied to the driving transistor through the switch transistor of each pixel 101. The source driver 110, as illustrated in FIG. 2, may be implemented with one or more source drive integrated circuits (ICs) SIC1 to SICn. Each of the source drive ICs SIC1 to SICn may further include a touch driver which generates a touch sensor driving signal and converts an electric charge amount variation of the touch sensor into touch raw data.

The gate driver 120 may be provided in a bezel region BZ, which does not display an image, outside a screen in the display panel 100. The gate driver 120 may sequentially supply the gate lines GL with a gate signal synchronized with the data voltage, based on control by the timing controller 130. The gate signal may select pixel lines L1 to Ln into which data voltages are charged and may simultaneously activate pixels 101 provided in corresponding pixel lines L1 to Ln. The gate driver 120 may output the gate signal and may shift the gate signal by using one or more shift registers. The gate signal may include one or more scan signals and may further include one or more emission signals. The gate signal may swing between an on level and an off level.

The timing controller 130 may receive the image data DATA and a timing signal, synchronized with the image data DATA, from a host system (not shown). The timing signal may include a vertical synchronization signal Vsync, a horizontal synchronization signal Hsync, a clock signal DCLK, and a data enable signal DE. The vertical synchronization signal Vsync may define a vertical period. The horizontal synchronization signal Hsync may define a horizontal period. The data enable signal DE may define a time for which the image data DATA is transferred in the vertical period or the horizontal period. In a method of counting the data enable signal DE, the vertical period and the horizontal period may be known, and thus, the vertical synchronization signal Vsync and the horizontal synchronization signal Hsync may be omitted.

The timing controller 130 may generate a source timing control signal DDC for controlling an operation timing of the data driver 110 and a gate timing control signal GDC for controlling an operation timing of the gate driver 120, based on the timing signal (for example, Vsync, Hsync, and DE) received from the host system.

The timing controller 130 may multiply an input frame frequency by i (where i is a natural number) to control an operation timing of each of the display panel drivers 110 and 120 with "input frame frequency(Hz)×i". The input frame frequency may be about 60 Hz in national television standards committee (NTSC) and may be about 50 Hz in phase-alternating line (PAL).

The host system may be one of a television (TV), a set-top box, a navigation system, a personal computer (PC), a home theater system, an automotive display system, a mobile device, and a wearable device. In mobile devices and wearable devices, the source driver 110, the timing controller 130, and a level shifter 140 may be integrated into one IC.

The level shifter 140 may level-shift a logic on/off voltage of the gate timing control signal GDC, output from the timing controller 130, to a gate on voltage and a gate off voltage and may supply the gate on voltage or the gate off voltage to the gate driver 120. The logic off voltage of the gate timing control signal GDC may be converted into the gate off voltage, and the logic on voltage of the gate timing control signal GDC may be converted into the gate on voltage.

The timing controller 130 may transfer the image data DATA to the source driver 110 through an internal interface circuit. The internal interface circuit may be implemented as an embedded clock point to point interface (EPI), but is not limited thereto.

FIG. 2 is a diagram illustrating a pixel circuit of a display apparatus according to a first embodiment.

The pixel circuit of the display apparatus according to the first embodiment may be implemented as in FIG. 2, so as to decrease a threshold voltage sensing time of a driving transistor.

Referring to FIG. 2, the pixel circuit according to the first embodiment may include a driving transistor DT, a light emitting device EL, first to fourth transistors T1 to T4, a first capacitor Cst1, and a second capacitor Cst2.

The driving transistor DT may include a gate electrode connected with a gate node DTG, a drain electrode connected with a high level pixel power source EVDD, and a source electrode connected with a source node DTS. The driving transistor DT may generate a driving current corresponding to a gate-source voltage thereof.

The light emitting device EL may include an anode electrode connected with the source node DTS, a cathode electrode connected with a low level pixel power source EVSS, and an emission compound layer disposed between the anode electrode and the cathode electrode. The light emitting device EL may emit light with the driving current supplied from the driving transistor DT.

The first transistor T1 may be turned on based on a first scan signal SC1 having an on level and may apply an initialization voltage Vinit to the gate node DTG. The first transistor T1 may be a switch transistor which includes a gate electrode connected with a first gate line GL1, a drain electrode connected with an input terminal of the initialization voltage Vinit, and a source electrode connected with the gate node DTG.

The second transistor T2 may be turned on based on a second scan signal SC2 having an on level and may apply a reference voltage Vref to the source node DTS. The second transistor T2 may be a switch transistor which includes a gate electrode connected with a second gate line GL2, a drain electrode connected with an input terminal of the reference voltage Vref, and a source electrode connected with the source node DTS. The reference voltage Vref may be a voltage which is sufficiently lower than the initialization voltage Vinit. That is, a difference voltage between the initialization voltage Vinit and the reference voltage Vref may be a voltage which is sufficiently higher than a threshold voltage of the driving transistor DT.

The first capacitor Cst1 may be connected between the gate node DTG and the source node DTS.

The second capacitor Cst2 may include one electrode connected with the source node DTS and the other electrode connected with the third transistor T3.

The third transistor T3 may be turned on based on a third scan signal SC3 having an on level and may connect the gate node DTG with the other electrode of the second capacitor Cst2. The third transistor T3 may be a switch transistor which includes a gate electrode connected with a third gate line GL3, a drain electrode connected with the gate node DTG, and a source electrode connected with the other electrode of the second capacitor Cst2.

The fourth transistor T4 may be turned on based on a fourth scan signal SC4 having an on level and may apply a data voltage Vdata to the gate node DTG. The fourth transistor T4 may be a switch transistor which includes a gate electrode connected with a fourth gate line GL4, a drain electrode connected with the data line DL, and a source electrode connected with the gate node DTG. A voltage level of the data voltage Vdata may be set to be proportional to a gray level of image data within a voltage range which is higher than the initialization voltage Vinit.

In the pixel circuit according to the first embodiment, the first capacitor Cst1 may be used in a source follower operation for sensing the threshold voltage of the driving transistor DT. To decrease a threshold voltage sensing time of the driving transistor DT, a capacitance of the first capacitor Cst1 may be designed to be small. However, when a capacitance of the first capacitor Cst1 is small, a capability to hold a gate-source voltage of the driving transistor DT may be reduced after the threshold voltage of the driving transistor DT is sensed.

The second capacitor Cst2 may solve a problem where a holding capability of the first capacitor Cst1 is reduced. To this end, a capacitance of the second capacitor Cst2 may be sufficiently greater than that of the first capacitor Cst1.

The second capacitor Cst2 should not affect the gate-source voltage of the driving transistor DT while the threshold voltage of the driving transistor DT is being sensed. To this end, while the threshold voltage of the driving transistor DT is being sensed, the third transistor T3 may cut off an electrical connection between the gate electrode DTG of the third transistor T3 and the other electrode of the second capacitor Cst2.

The pixel circuit according to the first embodiment may decrease a threshold voltage sensing time of the driving transistor DT without a reduction in capability to hold the gate-source voltage of the driving transistor DT, and thus, may be effectively applied to a display apparatus for high speed driving.

Figure 3:
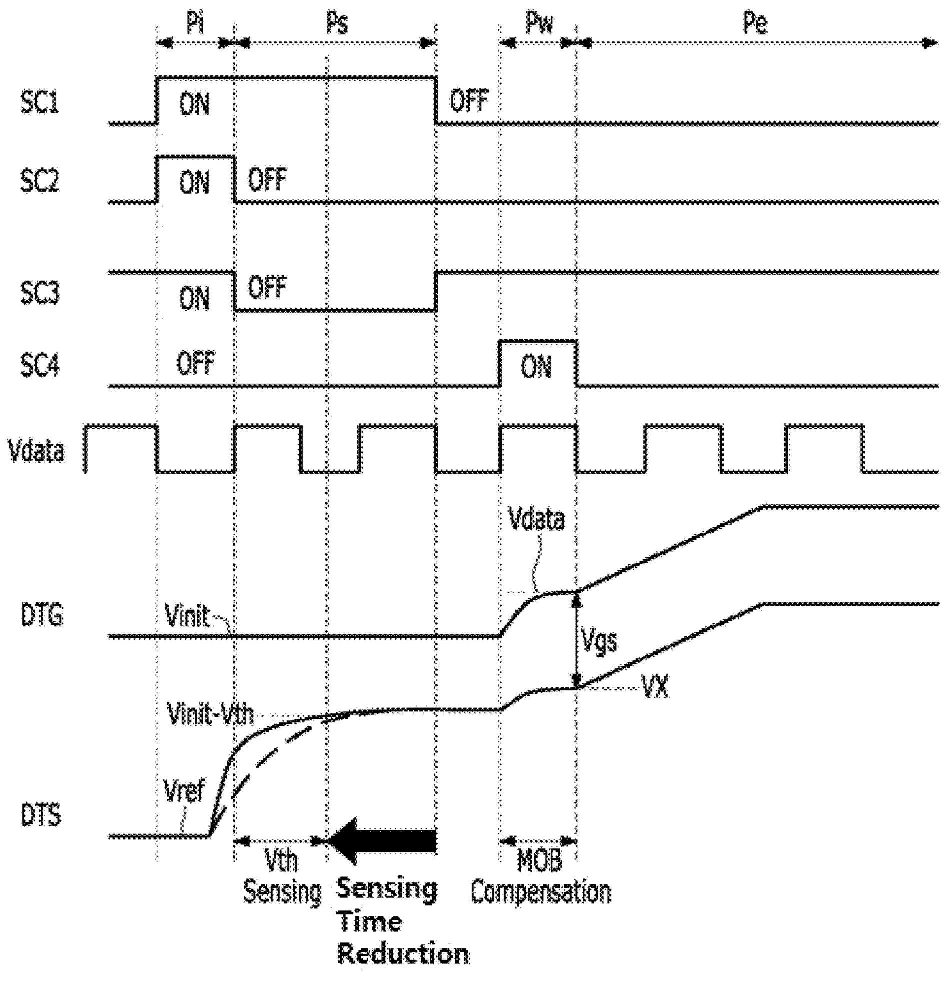
FIG. 3 is a driving waveform diagram of the pixel circuit of FIG. 2.
Figure 4A:
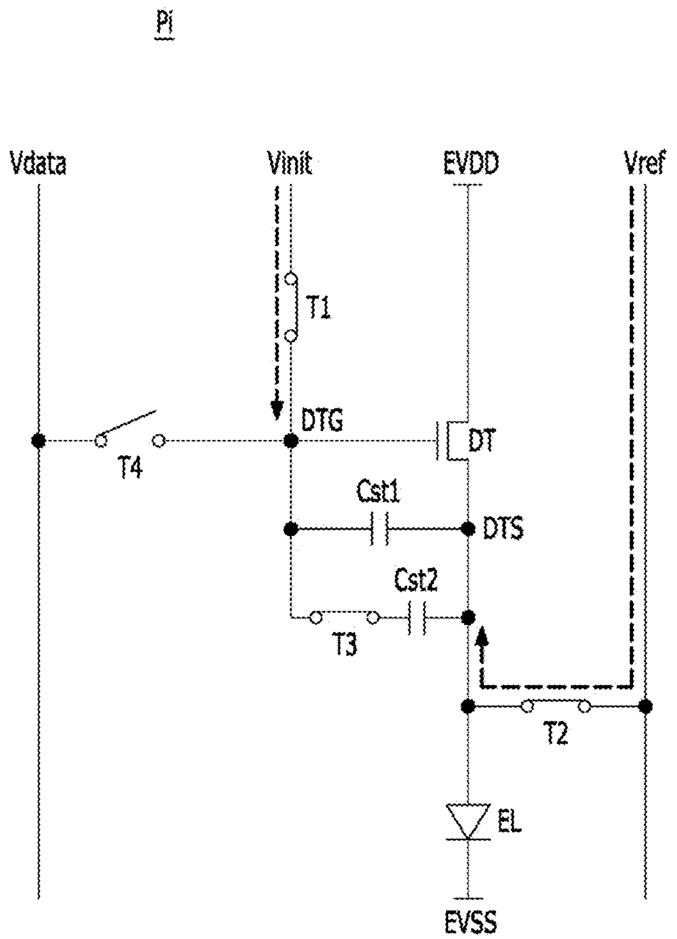
FIG. 4A is a diagram illustrating an operation of a pixel circuit in an initialization period of FIG. 3.
Figure 4B:
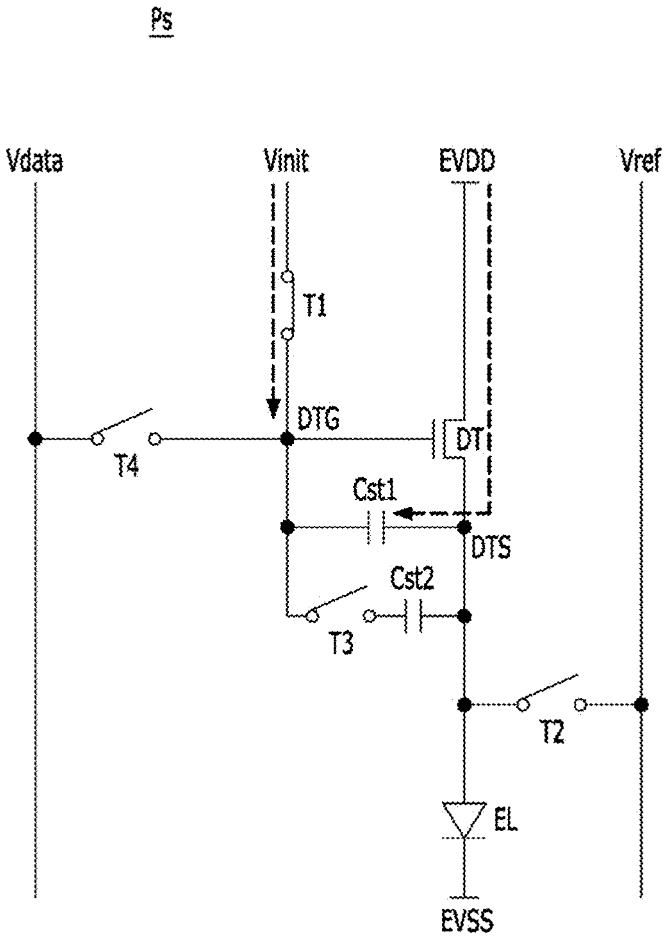
FIG. 4B is a diagram illustrating an operation of a pixel circuit in a sensing period of FIG. 3.
Figure 4C:
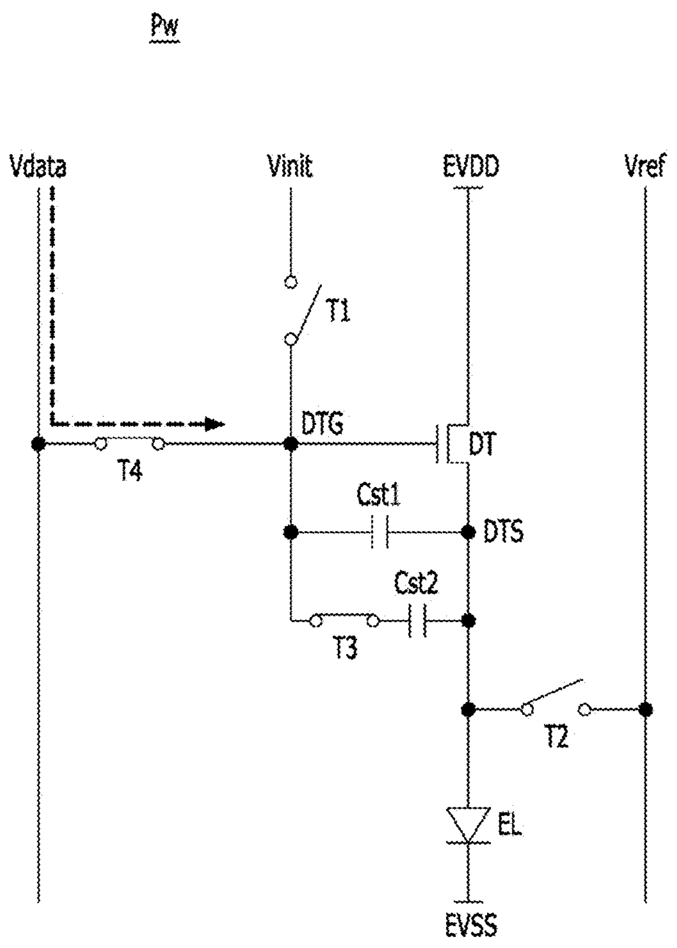
FIG. 4C is a diagram illustrating an operation of a pixel circuit in a writing period of FIG. 3.
Figure 4D:
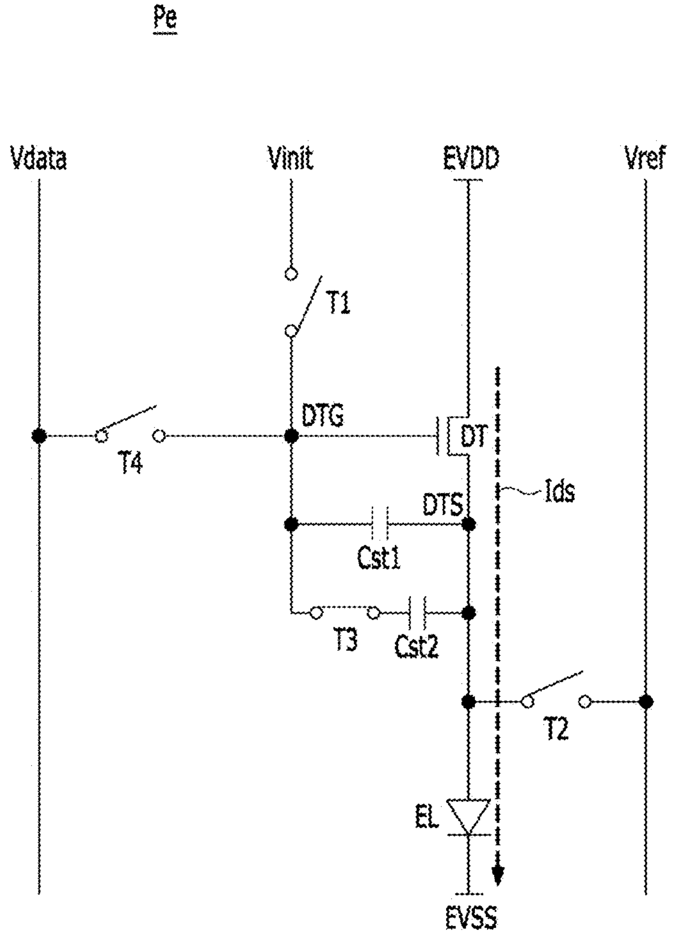
FIG. 4D is a diagram illustrating an operation of a pixel circuit in an emission period of FIG. 3.

FIG. 3 is a driving waveform diagram of the pixel circuit of FIG. 2. FIG. 4A is a diagram illustrating an operation of a pixel circuit in an initialization period of FIG. 3. FIG. 4B is a diagram illustrating an operation of a pixel circuit in a sensing period of FIG. 3. FIG. 4C is a diagram illustrating an operation of a pixel circuit in a writing period of FIG. 3. FIG. 4D is a diagram illustrating an operation of a pixel circuit in an emission period of FIG. 3.

Referring to FIG. 3, in one frame, the pixel circuit may sequentially operate in an initialization period Pi, a sensing period Ps, a writing period Pw, and an emission period Pe which are arranged in a time order.

Referring to FIGS. 3 and 4A, in the initialization period Pi, the first to third scan signals SC1 to SC3 may be input at an on level, and the fourth scan signal SC4 may be input at an off level.

In the initialization period Pi, the first to third transistors T1 to T3 may be turned on, and the fourth transistor T4 may be turned off. As a result, in the initialization period Pi, the gate node DTG may be reset to the initialization voltage Vinit, and the source node DTS may be reset to the reference voltage Vref.

A difference voltage between the initialization voltage Vinit and the reference voltage Vref may be higher than the threshold voltage of the driving transistor DT. Because the gate-source voltage of the driving transistor DT reset in the initialization period Pi is higher than the threshold voltage, the driving transistor DT may be turned on.

Referring to FIGS. 3 and 4B, in the sensing period Ps, the first scan signal SC1 may be input at an on level, and the second to fourth scan signals SC2 to SC4 may be input at an off level.

In the sensing period Ps, the first transistor T1 may be turned on, and the second to fourth transistors T2 to T4 may be turned off. In the sensing period Ps, the driving transistor DT may operate as a source follower, based on the driving current flowing in the driving transistor DT. Based on the source follower operation, a voltage of the source node DTS may increase toward the initialization voltage Vinit from the reference voltage Vref. An increase in voltage of the source node DTS may be continued until the driving transistor DT is turned off, and the gate-source voltage of when the driving transistor DT is turned off may be the threshold voltage Vth of the driving transistor DT.

The sensed threshold voltage Vth of the driving transistor DT may be stored in the first capacitor Cst1. Because a capacitance of the first capacitor Cst1 is sufficiently small, the threshold voltage Vth of the driving transistor DT may be quickly sensed in the sensing period Ps.

Referring to FIGS. 3 and 4C, in the writing period Pw, the first and second scan signals SC1 and SC2 may be input at an off level, and the third and fourth scan signals SC3 and SC4 may be input at an on level.

In the writing period Pw, the first and second transistors T1 and T2 may be turned off, and the third and fourth transistors T3 and T4 may be turned on. As a result, the data voltage Vdata may be applied to the gate node DTG in the writing period Pw.

In the writing period Pw, an electric potential of the gate node DTG may increase from the initialization voltage Vinit to the data voltage Vdata. In the writing period Pw, the source node DTS may be coupled to the gate node DTG through the first and second capacitors Cst1 and Cst2, and thus, an electric potential of the source node DTS may also increase from "Vinit-Vth" to VX. In this case, VX may be "Vinit-Vth+{(CST1+CST2)/(CST1+CST2+Coled)}*(Vdata−Vinit)". CST1 may denote a capacitance of the first capacitor Cst1, CST2 may denote a capacitance of the second capacitor Cst2, and Coled may denote a parasitic capacitance between the anode electrode and the cathode electrode of the light emitting device EL.

In the writing period Pw, a gate-source voltage Vgs of the driving transistor DT may be higher than the threshold voltage, namely, may be set to an on condition. In such a process, an electron mobility MOB of the driving transistor DT may be compensated for. As the electron mobility MOB decreases, the gate-source voltage Vgs of the driving transistor DT may be set to be high, and on the contrary, as the electron mobility MOB increases, the gate-source voltage Vgs of the driving transistor DT may be set to be low.

Referring to FIGS. 3 and 4D, in the emission period Pe, the first, second, and fourth scan signals SC1, SC2, and SC4 may be input at an off level, and the third scan signal SC3 may be input at an on level.

In the emission period Pe, a driving current Ids may flow in the driving transistor DT. Based on the driving current Ids, a voltage of the source node DTS of the driving transistor DT may increase up to an operation point voltage of the light emitting device EL. At this time, because the gate node DTG is coupled to the source node DTS through the first and second capacitors Cst1 and Cst2, an electric potential of the gate node DTG may increase. As a result, the gate-source voltage Vgs set in the writing period Pw may be maintained in the emission period Pe also. The second capacitor Cst2 may complement an insufficient holding capability of the first capacitance Cst1 to prevent a variation of the gate-source voltage Vgs.

The light emitting device EL may emit light with the driving current Ids when a voltage of the source node DTS of the driving transistor DT is equal to an operation point voltage. The driving current Ids may satisfy "k/2*[{Coled/(CST1+CST2+Coled)} *(Vdata−Vinit)]$^2$". Here, k may be a constant value which is determined based on a channel capacitance, electron mobility, and a parasitic capacitance.

The driving current Ids may be determined regardless of the threshold voltage Vth of the driving transistor DT. The driving current Ids may not be affected even when the threshold voltage Vth of the driving transistor DT is shifted.

Figure 5:
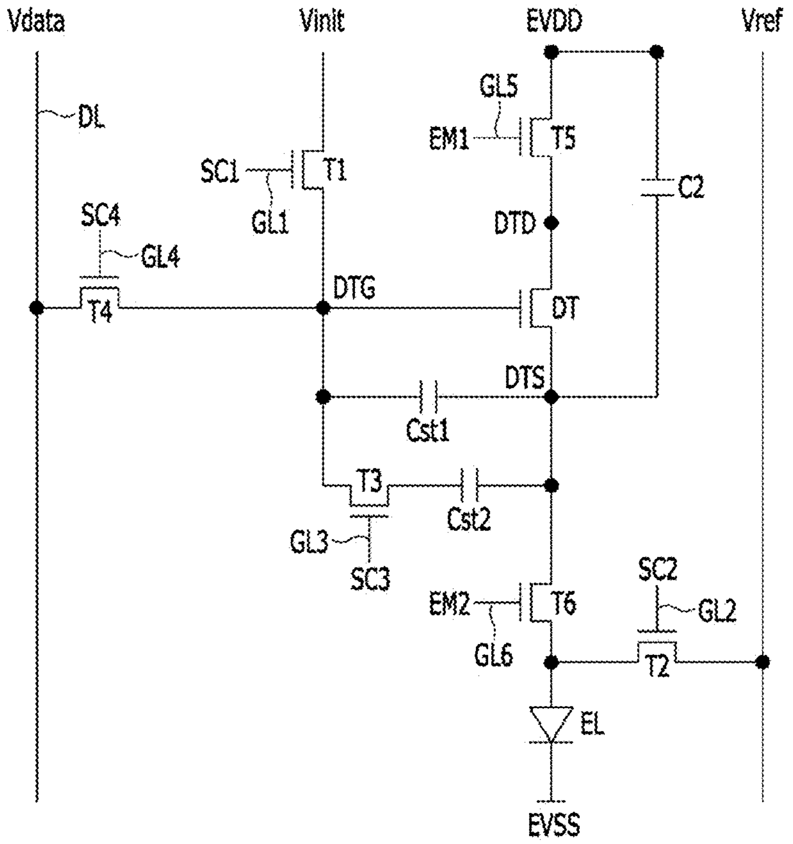
FIG. 5 is a diagram illustrating a pixel circuit of a display apparatus according to a second embodiment.

FIG. 5 is a diagram illustrating a pixel circuit of a display apparatus according to a second embodiment.

The pixel circuit of the display apparatus according to the second embodiment may be implemented as in FIG. 5, so as to decrease a threshold voltage sensing time of a driving transistor.

Referring to FIG. 5, the pixel circuit according to the second embodiment may include a driving transistor DT, a light emitting device EL, first to fourth transistors T1 to T4, a first capacitor Cst1, and a second capacitor Cst2. The pixel circuit according to the second embodiment may further include fifth and sixth transistors T5 and T6 for compensating for an on bias stress of the light emitting device EL and may further include a third capacitor C2 for increasing the operation stability of the pixel circuit.

The driving transistor DT may include a gate electrode connected with a gate node DTG, a drain electrode connected with a high level pixel power source EVDD, and a source electrode connected with the source node DTS. The driving transistor DT may generate a driving current corresponding to a gate-source voltage thereof.

The light emitting device EL may include an anode electrode connected with the source node DTS, a cathode electrode connected with a low level pixel power source EVSS, and an emission compound layer disposed between the anode electrode and the cathode electrode. The light emitting device EL may emit light with the driving current supplied from the driving transistor DT.

The first transistor T1 may be turned on based on a first scan signal SC1 having an on level and may apply an initialization voltage Vinit to the gate node DTG. The first transistor T1 may be a switch transistor which includes a gate electrode connected with a first gate line GL1, a drain electrode connected with an input terminal of the initialization voltage Vinit, and a source electrode connected with the gate node DTG.

The second transistor T2 may be turned on based on a second scan signal SC2 having an on level and may apply a reference voltage Vref to the source node DTS. The second transistor T2 may be a switch transistor which includes a gate electrode connected with a second gate line GL2, a drain electrode connected with an input terminal of the reference voltage Vref, and a source electrode connected with the source node DTS. The reference voltage Vref may be a voltage which is sufficiently lower than the initialization voltage Vinit. That is, a difference voltage between the initialization voltage Vinit and the reference voltage Vref may be a voltage which is sufficiently higher than a threshold voltage of the driving transistor DT.

The first capacitor Cst1 may be connected between the gate node DTG and the source node DTS.

The second capacitor Cst2 may include one electrode connected with the source node DTS and the other electrode connected with the third transistor T3.

The third transistor T3 may be turned on based on a third scan signal SC3 having an on level and may connect the gate node DTG with the other electrode of the second capacitor Cst2. The third transistor T3 may be a switch transistor which includes a gate electrode connected with a third gate line GL3, a drain electrode connected with the gate node DTG, and a source electrode connected with the other electrode of the second capacitor Cst2.

The fourth transistor T4 may be turned on based on a fourth scan signal SC4 having an on level and may apply a data voltage Vdata to the gate node DTG. The fourth transistor T4 may be a switch transistor which includes a gate electrode connected with a fourth gate line GL4, a drain electrode connected with the data line DL, and a source electrode connected with the gate node DTG. A voltage level of the data voltage Vdata may be set to be proportional to a gray level of image data within a voltage range which is higher than the initialization voltage Vinit.

The fifth transistor T5 may be turned on based on a first emission signal EM1 having an on level and may connect the high level pixel power source EVDD with the drain electrode of the driving transistor DT. The fifth transistor T5 may be a switch transistor which includes a gate electrode connected with a fifth gate line GL5, a drain electrode connected with the high level pixel power source EVDD, and a source electrode connected with the drain electrode of the driving transistor DT.

The sixth transistor T6 may be turned on based on a second emission signal EM2 having an on level and may connect the source node DTS with the anode electrode of the light emitting device EL. The sixth transistor T6 may be a switch transistor which includes a gate electrode connected with a sixth gate line GL6, a drain electrode connected with the anode electrode of the light emitting device EL, and a source electrode connected with the source node DTS.

The third capacitor C2 may be connected between the high level pixel power source EVDD and the source node DTS.

In the pixel circuit according to the second embodiment, the first capacitor Cst1 may be used in a source follower operation for sensing the threshold voltage of the driving transistor DT. To decrease a threshold voltage sensing time of the driving transistor DT, a capacitance of the first capacitor Cst1 may be designed to be small. However, when a capacitance of the first capacitor Cst1 is small, a capability to hold a gate-source voltage of the driving transistor DT may be reduced after the threshold voltage of the driving transistor DT is sensed.

The second capacitor Cst2 may solve a problem where a holding capability of the first capacitor Cst1 is reduced. To this end, a capacitance of the second capacitor Cst2 may be sufficiently greater than that of the first capacitor Cst1. Also, a capacitance of the third capacitor C3 may be sufficiently greater than that of the first capacitor Cst1.

The second capacitor Cst2 should not affect the gate-source voltage of the driving transistor DT while the threshold voltage of the driving transistor DT is being sensed. To this end, while the threshold voltage of the driving transistor DT is being sensed, the third transistor T3 may cut off an electrical connection between the gate electrode DTG of the third transistor T3 and the other electrode of the second capacitor Cst2.

The pixel circuit according to the second embodiment may decrease a threshold voltage sensing time of the driving transistor DT without a reduction in capability to hold the gate-source voltage of the driving transistor DT, and thus, may be effectively applied to a display apparatus for high speed driving.

Figure 6:
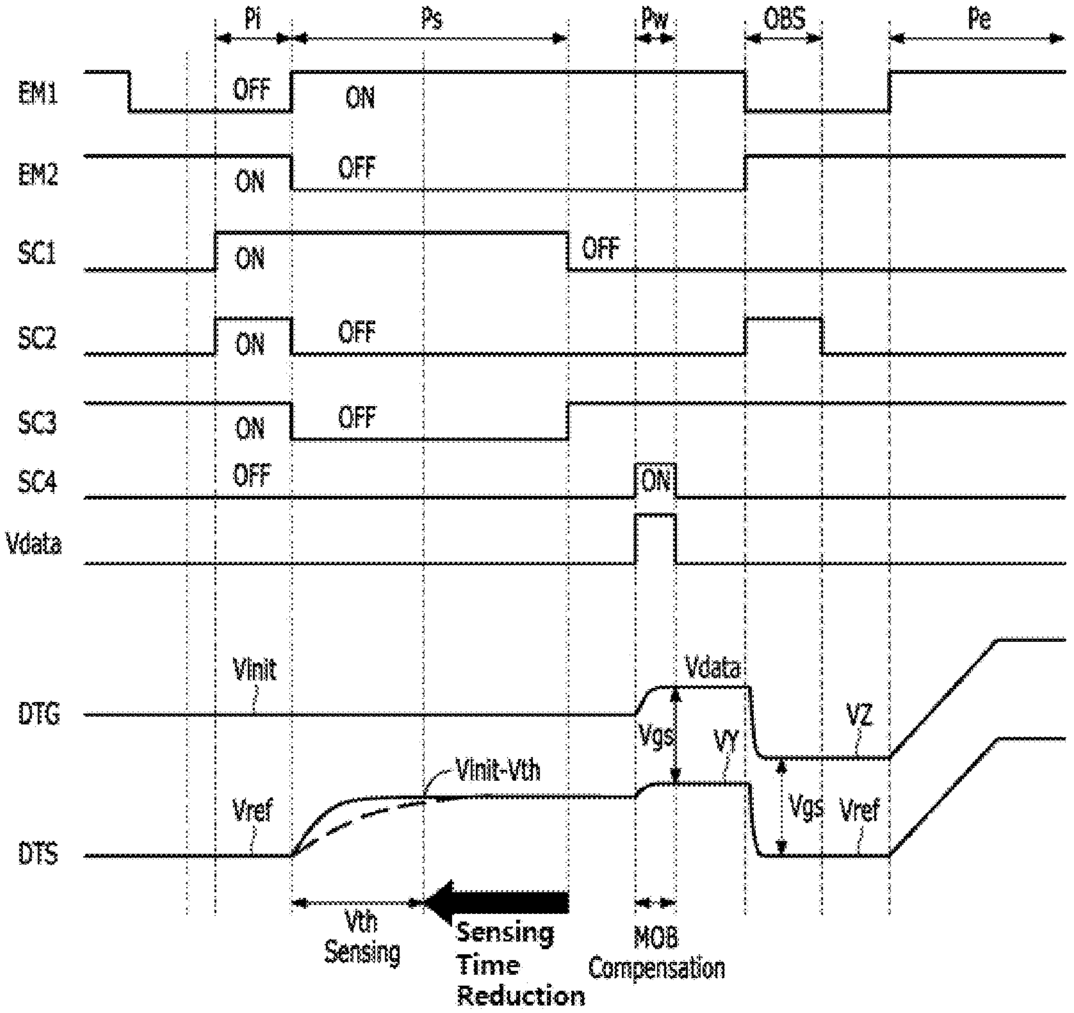
FIG. 6 is a driving waveform diagram of the pixel circuit of FIG. 5.
Figure 7A:
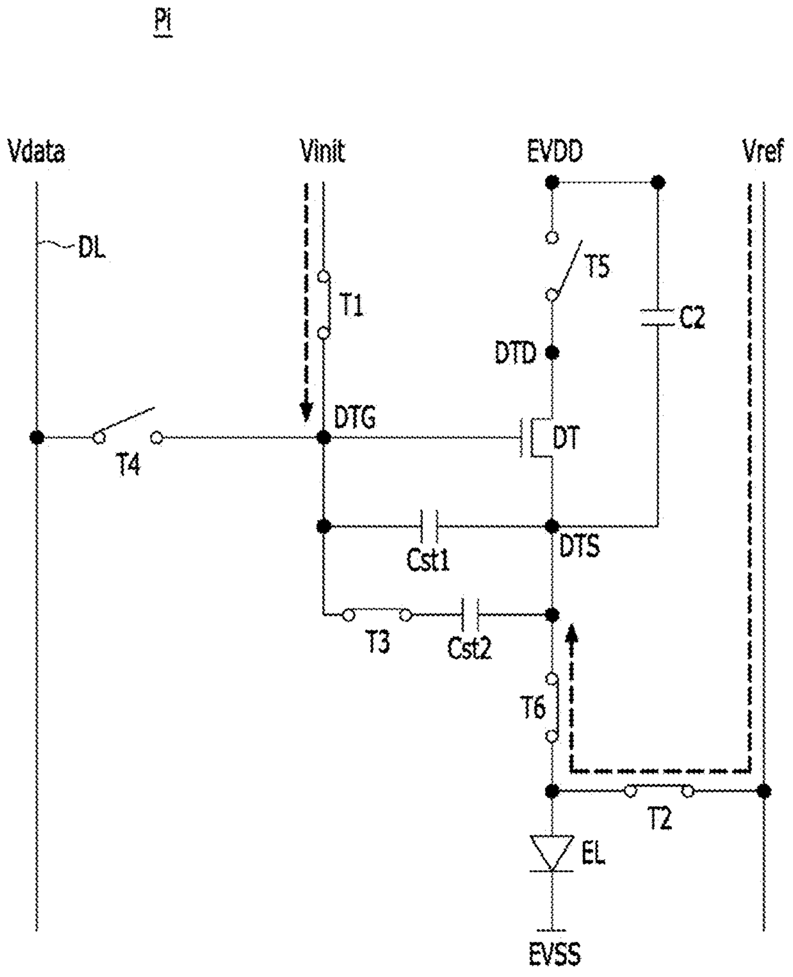
FIG. 7A is a diagram illustrating an operation of a pixel circuit in an initialization period of FIG. 5.
Figure 7B:
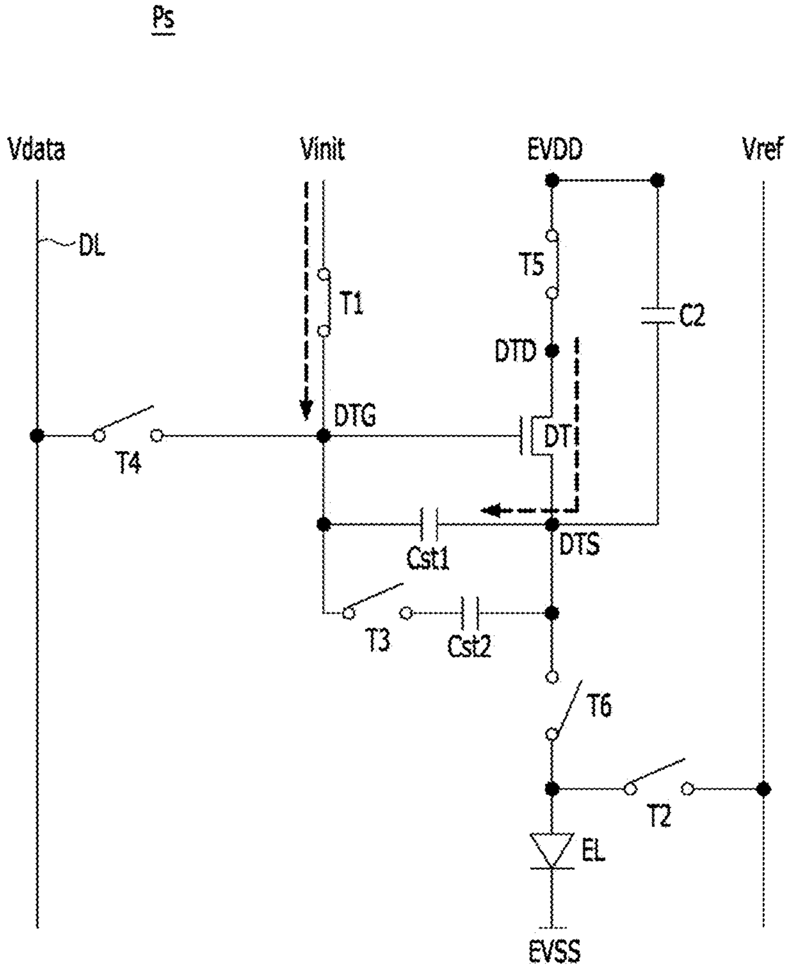
FIG. 7B is a diagram illustrating an operation of a pixel circuit in a sensing period of FIG. 5.
Figure 7C:
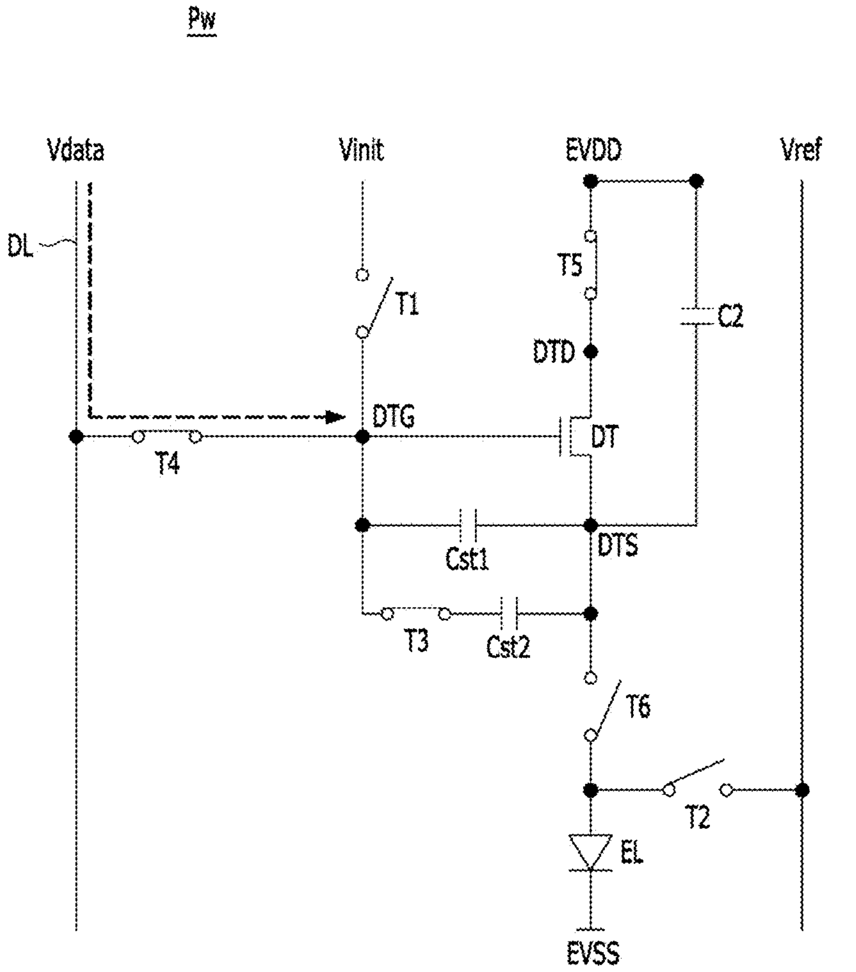
FIG. 7C is a diagram illustrating an operation of a pixel circuit in a writing period of FIG. 5.
Figure 7D:
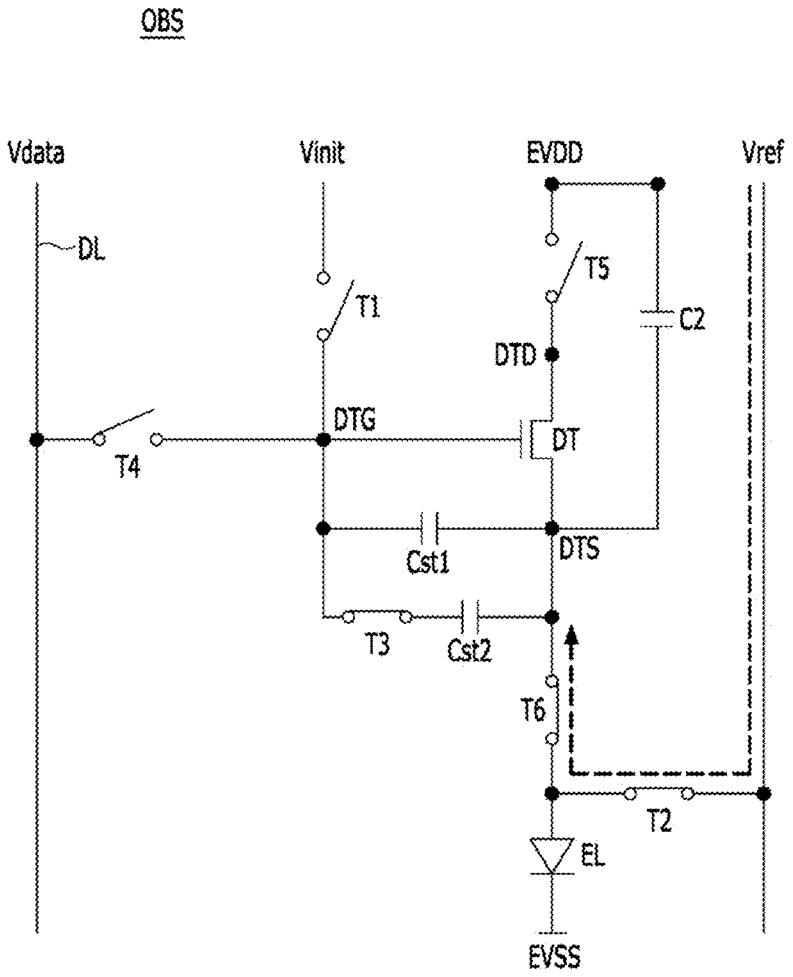
FIG. 7D is a diagram illustrating an operation of a pixel circuit in a stress compensation period of FIG. 5.
Figure 7E:
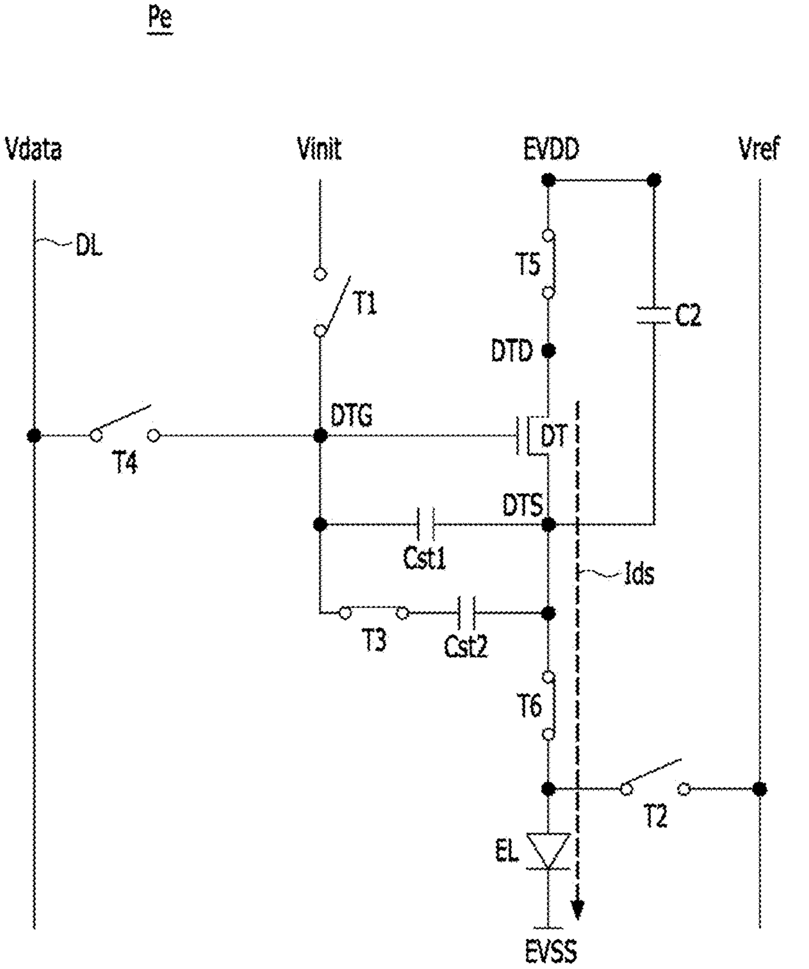
FIG. 7E is a diagram illustrating an operation of a pixel circuit in an emission period of FIG. 5.

FIG. 6 is a driving waveform diagram of the pixel circuit of FIG. 5. FIG. 7A is a diagram illustrating an operation of a pixel circuit in an initialization period of FIG. 5. FIG. 7B is a diagram illustrating an operation of a pixel circuit in a sensing period of FIG. 5. FIG. 7C is a diagram illustrating an operation of a pixel circuit in a writing period of FIG. 5. FIG. 7D is a diagram illustrating an operation of a pixel circuit in a stress compensation period of FIG. 5. FIG. 7E is a diagram illustrating an operation of a pixel circuit in an emission period of FIG. 5.

Referring to FIG. 6, in one frame, the pixel circuit may sequentially operate an initialization period Pi, a sensing period Ps, a writing period Pw, a stress compensation period OBS, and an emission period Pe which are arranged in a time order.

Referring to FIGS. 6 and 7A, in the initialization period Pi, the first to third scan signals SC1 to SC3 may be input at an on level, and the fourth scan signal SC4 may be input at an off level. Also, the first emission signal EM1 may be input at an off level, and the second emission signal EM2 may be input at an on level.

In the initialization period Pi, the first to third transistors T1 to T3 may be turned on, and the fourth transistor T4 may be turned off. Also, the fifth transistor T5 may be turned off, and the sixth transistor T6 may be turned on. As a result, in the initialization period Pi, the gate node DTG may be reset to the initialization voltage Vinit, and the source node DTS may be reset to the reference voltage Vref.

A difference voltage between the initialization voltage Vinit and the reference voltage Vref may be higher than the threshold voltage of the driving transistor DT. Because the gate-source voltage of the driving transistor DT reset in the initialization period Pi is higher than the threshold voltage, the driving transistor DT may be turned on.

Referring to FIGS. 6 and 7B, in the sensing period Ps, the first scan signal SC1 may be input at an on level, and the second to fourth scan signals SC2 to SC4 may be input at an off level. Also, the first emission signal EM1 may be input at an on level, and the second emission signal EM2 may be input at an off level.

In the sensing period Ps, the first transistor T1 may be turned on, and the second to fourth transistors T2 to T4 may be turned off. Also, the fifth transistor T5 may be turned on, and the sixth transistor T6 may be turned off. In the sensing period Ps, the driving transistor DT may operate as a source follower, based on the driving current flowing in the driving transistor DT. Based on the source follower operation, a voltage of the source node DTS may increase toward the initialization voltage Vinit from the reference voltage Vref. An increase in voltage of the source node DTS may be continued until the driving transistor DT is turned off, and the gate-source voltage of when the driving transistor DT is turned off may be the threshold voltage Vth of the driving transistor DT.

The sensed threshold voltage Vth of the driving transistor DT may be stored in the first capacitor Cst1. Because a capacitance of the first capacitor Cst1 is sufficiently small, the threshold voltage Vth of the driving transistor DT may be quickly sensed in the sensing period Ps.

Referring to FIGS. 6 and 7C, in the writing period Pw, the first and second scan signals SC1 and SC2 may be input at an off level, and the third and fourth scan signals SC3 and SC4 may be input at an on level. Also, the first emission signal EM1 may be input at an on level, and the second emission signal EM2 may be input at an off level.

In the writing period Pw, the first and second transistors T1 and T2 may be turned off, and the third and fourth transistors T3 and T4 may be turned on. Also, the fifth transistor T5 may be turned on, and the sixth transistor T6 may be turned off. As a result, the data voltage Vdata may be applied to the gate node DTG in the writing period Pw.

In the writing period Pw, an electric potential of the gate node DTG may increase from the initialization voltage Vinit to the data voltage Vdata. In the writing period Pw, the source node DTS may be coupled to the gate node DTG through the first and second capacitors Cst1 and Cst2, and thus, an electric potential of the source node DTS may also increase from "Vinit-Vth" to VY. In this case, VY may be "Vinit-Vth+{(CST1+CST2)/(CST1+CST2+Cc2)}*(Vdata−Vinit)". CST1 may denote a capacitance of the first capacitor Cst1, CST2 may denote a capacitance of the second capacitor Cst2, and Cc2 may denote a capacitance of the third capacitor C2.

In the writing period Pw, a gate-source voltage Vgs of the driving transistor DT may be higher than the threshold voltage, namely, may be set to an on condition. In such a process, an electron mobility MOB of the driving transistor DT may be compensated for. As the electron mobility MOB decreases, the gate-source voltage Vgs of the driving transistor DT may be set to be high, and on the contrary, as the electron mobility MOB increases, the gate-source voltage Vgs of the driving transistor DT may be set to be low.

In the writing period Pw, the gate-source voltage Vgs of the driving transistor DT may be "Vinit-Vth+{(CST1+CST2)/(CST1+CST2+Cc2)}*(Vdata−Vinit)−Vref".

Referring to FIGS. 6 and 7D, in the stress compensation period OBS, the first and fourth scan signals SC1 and SC4 may be input at an off level, and the second and third scan signals SC2 and SC3 may be input at an on level. Also, the first emission signal EM1 may be input at an off level, and the second emission signal EM2 may be input at an on level.

In the stress compensation period OBS, the first and fourth transistors T1 and T4 may be turned off, and the second and third transistors T2 and T3 may be turned on. Also, the fifth transistor T5 may be turned off, and the sixth transistor T6 may be turned on.

In the stress compensation period OBS, the reference voltage Vref may be applied to the source node DTS. An electric potential of the source node DTS may decrease from VY to the reference voltage Vref, and thus, an on bias stress of the light emitting device EL may be reduced. In this case, the gate node DTG may be coupled to the source node DTS through the first and second capacitors Cst1 and Cst2, and thus, an electric potential of the gate node DTG may also decrease from the data voltage Vdata to VZ. VZ may be "Vdata-[Vinit−Vth+{(CST1+CST2)/(CST1+CST2+Cc2)}*(Vdata−Vinit)]".

As a result, the gate-source voltage Vgs set in the writing period Pw may be intactly maintained in the stress compensation period OBS.

Referring to FIGS. 6 and 7E, in the emission period Pe, the first, second, and fourth scan signals SC1, SC2, and SC4 may be input at an off level, and the third scan signal SC3 may be input at an on level. Also, the first and second emission signals EM1 and EM2 may be input at an on level.

In the emission period Pe, the driving current Ids may flow in the driving transistor DT. Based on the driving current Ids, a voltage of the source node DTS of the driving transistor DT may increase up to an operation point voltage of the light emitting device EL. At this time, because the gate node DTG is coupled to the source node DTS through the first and second capacitors Cst1 and Cst2, an electric potential of the gate node DTG may increase. As a result, the gate-source voltage Vgs set in the writing period Pw may be maintained in the emission period Pe also. The second capacitor Cst2 may complement an insufficient holding capability of the first capacitance Cst1 to prevent a variation of the gate-source voltage Vgs.

The light emitting device EL may emit light with the driving current Ids when a voltage of the source node DTS of the driving transistor DT is equal to an operation point voltage. The driving current Ids may satisfy "k/2*[{Cc2/(CST1+CST2+Cc2)} *(Vdata−Vinit)]$^2$". Here, k may be a constant value which is determined based on a channel capacitance of the driving transistor DT, electron mobility of the driving transistor DT, and a parasitic capacitance coupled with the driving transistor DT.

The driving current Ids may be determined regardless of the threshold voltage Vth of the driving transistor DT. The driving current Ids may not be affected even when the threshold voltage Vth of the driving transistor DT is shifted.

The present embodiment may realize the following effects.

The present embodiment may automatically compensate for the electron mobility and threshold voltage of a driving transistor in pixel driving, thereby increasing display quality.

The present embodiment may decrease a threshold voltage sensing time of a driving transistor without a reduction in capability to hold a gate-source voltage of the driving transistor, and thus, may effectively respond to a display apparatus for high speed driving.

The effects according to the present disclosure are not limited to the above examples, and other various effects may be included in the specification.

It will be apparent to those skilled in the art that various modifications and variations can be made in the pixel circuit of a display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A pixel circuit of a display apparatus, comprising:

a driving transistor configured to include a gate electrode coupled with a gate node, a drain electrode coupled with a high level pixel power source, and a source electrode coupled with a source node;

a light emitting device configured to include an anode electrode coupled with the source node and a cathode electrode coupled with a low level pixel power source;

a first transistor turned on based on a first scan signal having an on level to apply an initialization voltage to the gate node;

a second transistor turned on based on a second scan signal having an on level to apply a reference voltage to the source node;

a first capacitor coupled between the gate node and the source node;

a second capacitor coupled with the source node at one electrode thereof;

a third transistor turned on based on a third scan signal having an on level to couple the gate node with the other electrode of the second capacitor; and a fourth transistor turned on based on a fourth scan signal having an on level to apply a data voltage to the gate node, wherein one frame comprises an initialization period, a sensing period, a writing period, and an emission period which are arranged in a time order, wherein the first scan signal is input at the on level in the initialization period and the sensing period, the second scan signal is input at the on level in only the initialization period, the third scan signal is input at an off level in only the sensing period, and the fourth scan signal is input at the on level in only the writing period.

2. The pixel circuit of claim 1, wherein a capacitance of the first capacitor is less than a capacitance of the second capacitor.

3. The pixel circuit of claim 1, wherein the third transistor is turned off in a source follower operation period of the driving transistor for sensing a threshold voltage of the driving transistor and is turned on in the other period except the source follower operation period in the one frame.

4. The pixel circuit of claim 1, wherein:

in the initialization period, the gate node is reset to the initialization voltage and the source node is reset to the reference voltage, in the sensing period, a threshold voltage of the driving transistor is sensed and stored in the first capacitor, in the writing period, the data voltage is applied to the gate node, and in the emission period, the light emitting device emits light with a driving current of the driving transistor.

5. The pixel circuit of claim 4, wherein the driving current of the driving transistor is independent of the threshold voltage of the driving transistor.

6. The pixel circuit of claim 1, further comprising:

a fifth transistor turned on based on a first emission signal having an on level to couple the high level pixel power source with the drain electrode of the driving transistor;

a sixth transistor turned on based on a second emission signal having an on level to couple the source node with the anode electrode of the light emitting device; and a third capacitor coupled between the high level pixel power source and the source node.

7. The pixel circuit of claim 6, wherein a capacitance of the first capacitor is less than a capacitance of the third capacitor.

8. The pixel circuit of claim 6, wherein:

the one frame further comprises a stress compensation period between the writing period and the emission period, in the initialization period, the gate node is reset to the initialization voltage and the source node is reset to the reference voltage, in the sensing period, a threshold voltage of the driving transistor is sensed and stored in the first capacitor, in the writing period, the data voltage is applied to the gate node, in the stress compensation period, the reference voltage is applied to the source node to decrease an on bias stress of the light emitting device, and in the emission period, the light emitting device emits light with a driving current of the driving transistor.

9. The pixel circuit of claim 8, wherein:

the second scan signal is further input at the on level in the stress compensation period, the first emission signal is input at an off level in the initialization period and the stress compensation period and is input at the on level in the sensing period, the writing period, and the emission period, and the second emission signal is input at an off level in the sensing period and the writing period and is input at the on level in the initialization period, the stress compensation period and, and the emission period.

10. A display apparatus comprising the pixel circuit of claim 1.

* * * * *